(12) United States Patent
Bjørkgård

(10) Patent No.: US 7,665,745 B2
(45) Date of Patent: Feb. 23, 2010

(54) DEVICE FOR CONNECTING A WHEEL AXLE HOUSING WITH THE CHASSIS OF A VEHICLE

(75) Inventor: Sven Bjørkgård, Kongsberg (NO)

(73) Assignee: Kongsberg Automotive AS, Kongsberg (NO)

( * ) Notice: Subject to any disclaimer, the term of this patent is extended or adjusted under 35 U.S.C. 154(b) by 367 days.

(21) Appl. No.: 10/560,144

(22) PCT Filed: Jun. 7, 2004

(86) PCT No.: PCT/NO2004/000165

§ 371 (c)(1),
(2), (4) Date: Jun. 14, 2006

(87) PCT Pub. No.: WO2004/108445

PCT Pub. Date: Dec. 16, 2004

(65) Prior Publication Data

US 2006/0237937 A1     Oct. 26, 2006

(30) Foreign Application Priority Data

Jun. 10, 2003   (SE)   .................................... 0301685

(51) Int. Cl.
*B62D 61/12* (2006.01)
(52) U.S. Cl. .............................. 280/86.5; 280/124.106; 180/209
(58) Field of Classification Search ................. 180/209; 280/43, 86.5, 124.106
See application file for complete search history.

(56) References Cited

U.S. PATENT DOCUMENTS

| | | | |
|---|---|---|---|
| 3,589,700 A | | 6/1971 | Ruet et al. |
| 3,594,017 A | | 7/1971 | Grosseau |
| 3,912,293 A | * | 10/1975 | Harbers ...................... 280/81.1 |
| 4,065,153 A | * | 12/1977 | Pringle ........................ 280/86.5 |
| 4,165,792 A | * | 8/1979 | Hohl et al. ................ 180/24.02 |
| 4,314,709 A | * | 2/1982 | Silbernagel ................ 280/81.6 |
| 4,614,247 A | * | 9/1986 | Sullivan ................... 180/24.02 |
| 4,758,019 A | | 7/1988 | Tucker-Peake et al. |
| 5,230,528 A | * | 7/1993 | Van Raden et al. ......... 280/86.5 |
| 5,356,162 A | * | 10/1994 | Derrien ................... 280/43.18 |
| 5,540,454 A | * | 7/1996 | VanDenberg et al. ...... 280/81.1 |
| 5,549,322 A | * | 8/1996 | Hauri ........................ 280/86.5 |

(Continued)

FOREIGN PATENT DOCUMENTS

EP   0 512 550 A2   11/1992

(Continued)

*Primary Examiner*—Paul N Dickson
*Assistant Examiner*—Laura Freedman
(74) *Attorney, Agent, or Firm*—Merchant & Gould P.C.

(57) ABSTRACT

A device for the connection of a wheel axle housing with a chassis of a vehicle, comprising a stabilizer with a torsion element that is mounted in the chassis, to first arms, the rigidly attached to corresponding end portions of torsion element, to second arms, that are articulatedly connected with the first arms, and at least two spring/suspension elements with a first member, that is connected with the wheel axle housing, and a second member that is connected with the chassis. According to the invention, torsion element is mounted in the chassis, in the second arms is connected with the wheel axle housing and extend essentially vertically upwardly therefrom. The spring/suspension elements have third arms that are rigidly attached with the corresponding end portions of torsion element, and with the first member.

7 Claims, 2 Drawing Sheets

U.S. PATENT DOCUMENTS

| | | | |
|---|---|---|---|
| 5,588,665 A * | 12/1996 | Pierce et al. | 280/86.5 |
| 5,593,175 A * | 1/1997 | Oda et al. | 104/281 |
| 5,778,798 A * | 7/1998 | VanDenberg | 105/215.2 |
| 6,302,417 B1 | 10/2001 | Heyring | |
| 6,435,526 B1 | 8/2002 | Karlsson | |
| 6,796,566 B2 * | 9/2004 | VanDenberg | 280/86.5 |
| 6,832,772 B2 * | 12/2004 | Conover | 280/124.106 |
| 6,921,098 B2 * | 7/2005 | VanDenberg et al. | 280/124.116 |
| 2001/0022432 A1 | 9/2001 | Hebert | |

FOREIGN PATENT DOCUMENTS

| | | |
|---|---|---|
| FR | 1.299.215 | 6/1962 |
| FR | 2.177.784 | 11/1973 |
| GB | 2134052 A * | 8/1984 |
| JP | 1-266009 | 10/1989 |

* cited by examiner

DEVICE FOR CONNECTING A WHEEL AXLE HOUSING WITH THE CHASSIS OF A VEHICLE

SUMMARY

The invention relates to a device for the connection of a wheel axle housing with the chassis of a vehicle comprising a stabilizer with a rod-shaped torsion element that is mounted such that it can rotate around its lengthwise axis, two first arms, positioned across said torsion element, said first arms having first end portions that are rigidly attached to corresponding end portions of said torsion element, and two second arms (drop links), whose first end portions are articulatedly connected with the second end portions of the first arms, such that the arms extend at an angle in relation to the lengthwise axis of the torsion element, and further comprising
 a spring/suspension element comprising at least one spring/suspension member having a first member that is connected to the wheel axle housing, and a second member that is connected to the chassis, such that said member are capable of reciprocal resilient movement.

The use of the terms "spring/suspension element" and "spring-suspension element" refer to an element which is capable of acting as both a spring element and a suspension element.

A device of this type is common for vehicles and can be employed with front axles as well as back axles. Hereunder it is known that the torsion element's housing is attached to the wheel axle and that the torsion element runs along this. If the device is used for example with a back axle, the first arms normally run horizontally backwards from the torsion element, and the second arms extend vertically upwards, such that the second arms' upper end sections are connected with corresponding side portions of the chassis above and behind the wheel axle.

A disadvantage of such a device is that it occupies space in the vehicle behind the wheel axle and contributes to a greater length of the vehicle. In addition, because of the fact that the heavy torsion element and partly the first arms move together with the wheel axle, the mass of the vehicle not supported by the spring/suspension device will be great, something which negatively affects the vehicle's driving performance.

According to the prior art, the spring/suspension element can comprise for example four spring/suspension members that are attached in pairs to two horizontal yokes that are attached to and run crosswise to the wheel axle. These yokes are also heavy and contribute to the mass of the vehicle not supported by the spring/suspension device being great.

It is known from the prior art that it is normal for a back axle to be connected to the chassis by a so-called V-rod that maintains the back axle sideways in relation to the chassis, and two reaction rods that prevent a rotation of the back axle along the vertical axis of the vehicle. If the back axle moves in a vertical direction in relation to the chassis at the same time that the vehicle tilts, the result can be a mutual sideways movement of the end portions of the spring/suspension elements, which have resulted in an increased strain on the spring/suspension elements reducing their lifetime.

The following prior art publications are considered relevant:

US 6302417 reveal a system wherein the behaviour of the torsion bar may be varied. It describes a system where separate springs are provided to carry the weight of the chassis whereas a portion of the chassis weight is transferred to the wheel axle housing.

US 2001/022432 show a so called 'trailing arm' suspension system wherein the wheel is connected to the first arm without the use of a second arm. A disadvantage of such a system is the wheel not moving vertically during springing and the distance of the axle is varied during springing.

With vehicles having a plurality of front wheel axles and/or back wheel axles, it is known from the prior art that one or more of these can be lifted such that the corresponding wheel does not touch the ground. To achieve this, there is arranged in the chassis a support member or bridge that runs crossways in relation to the length of the vehicle, and that near the midsection of the wheel axle carries a special lifting actuator. The separate bridge and actuator contribute to increasing the weight of the vehicle, the production time and the price.

The object of the invention is to provide a device of the type described above that is to a lesser degree affected by the above-described disadvantages.

The characteristic features of the device according to the invention are specified in the claims.

The invention will be described in more detail below with reference to the figures that show embodiments of the device according to the invention.

DETAILED DESCRIPTION

Figure 1:
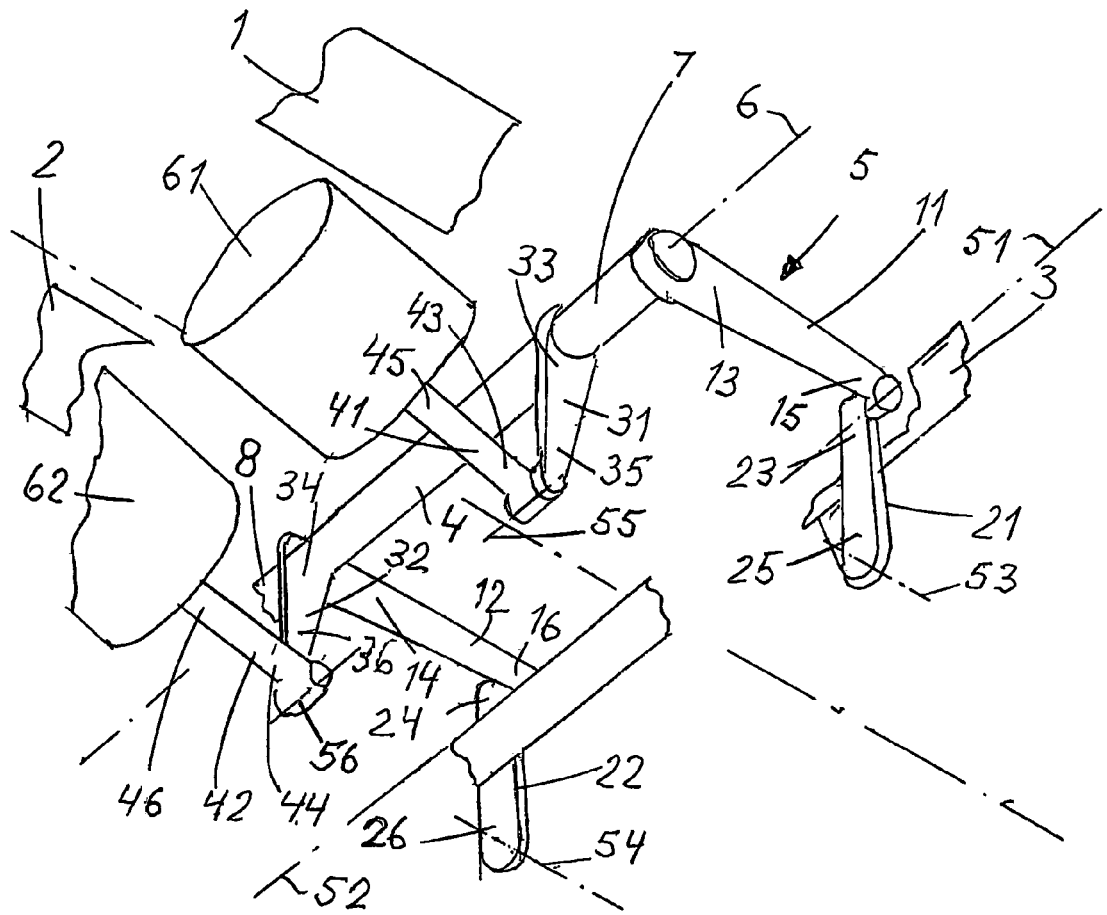
FIG. 1 is perspective view of a rear portion of a vehicle, seen from below and from the back, wherein obscuring portions have been omitted.
Figure 2:
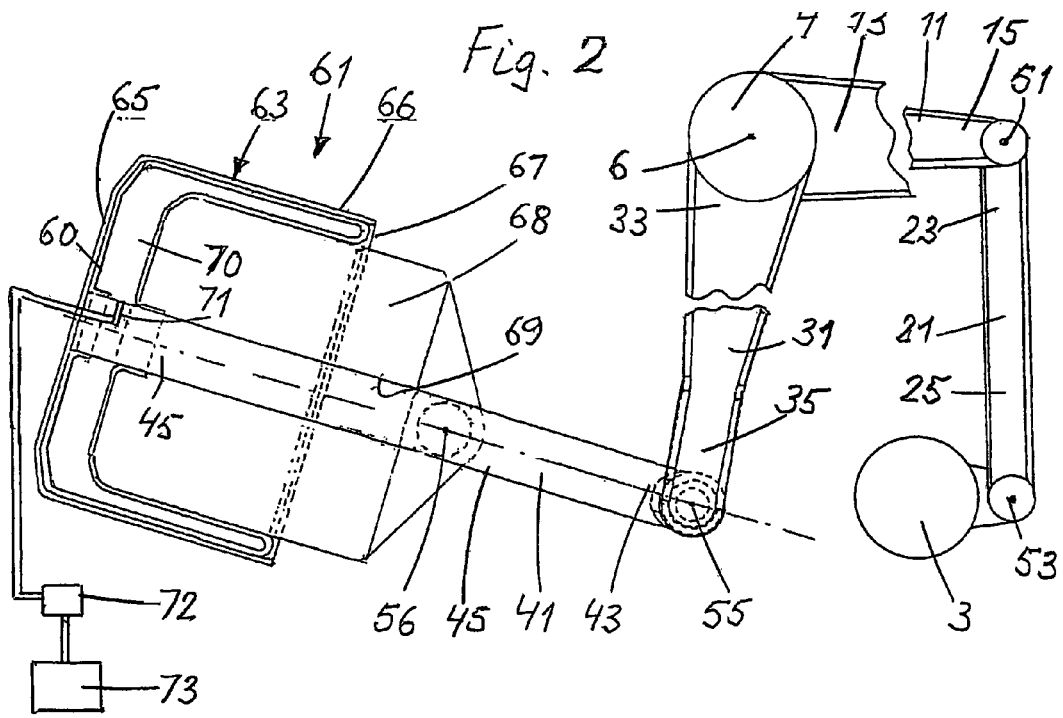
FIG. 2 is a longitudinal section through the device according to the invention, wherein obscuring portions have been omitted.

In FIGS. 1 and 2 is shown two frame beams 1, 2 of a chassis of a vehicle and a rear axle housing 3, which is located under frame beams 1, 2, wherein these frame beams hereafter shall represent the chassis. Running in front of and over back axle housing 3 in the crossways direction of the vehicle is a rod shaped torsion element 4 of a stabilizer 5. Torsion element 4 is arranged in the chassis such that it can rotate along its longitudinal axis 6.

Horizontally and behind torsion element 4 run two first arms 11,12 whose first end portions 13,14 are rigidly attached to corresponding end portions 7, 8 of torsion element 4. Second end portions 15,16 of the first arms 11,12 are articulatedly attached with corresponding first end portions 23,24 of two vertically, downwardly projecting second arms 21,22 (drop links) via shaft extensions 51,52 that extend in the crossways direction of the vehicle, and that are shown only by indicating the longitudinal axis of such shaft extensions. Second end portions 25,26 of the second arms 21,22 are articulatedly connected with back axle housing 3 via shaft extensions 53,54 that extend in the crossways direction of the vehicle, and that are likewise only shown by indicating the longitudinal axis of such shaft extensions.

The torsion element's end portions 7, 8 are also rigidly connected with corresponding, first end portions 33, 34 of two third arms 31, 32, that preferably extend at an angle downward and forward. Second end portions 35,36 of the third arms 31,32 are articulatedly connected with two corresponding first end portions 43,44 of two press rods or fourth arms 41,42 of two spring/suspension elements 61,62 via corresponding axles 55, which are shown only by indicating the axle's longitudinal axis.

Figure 3:
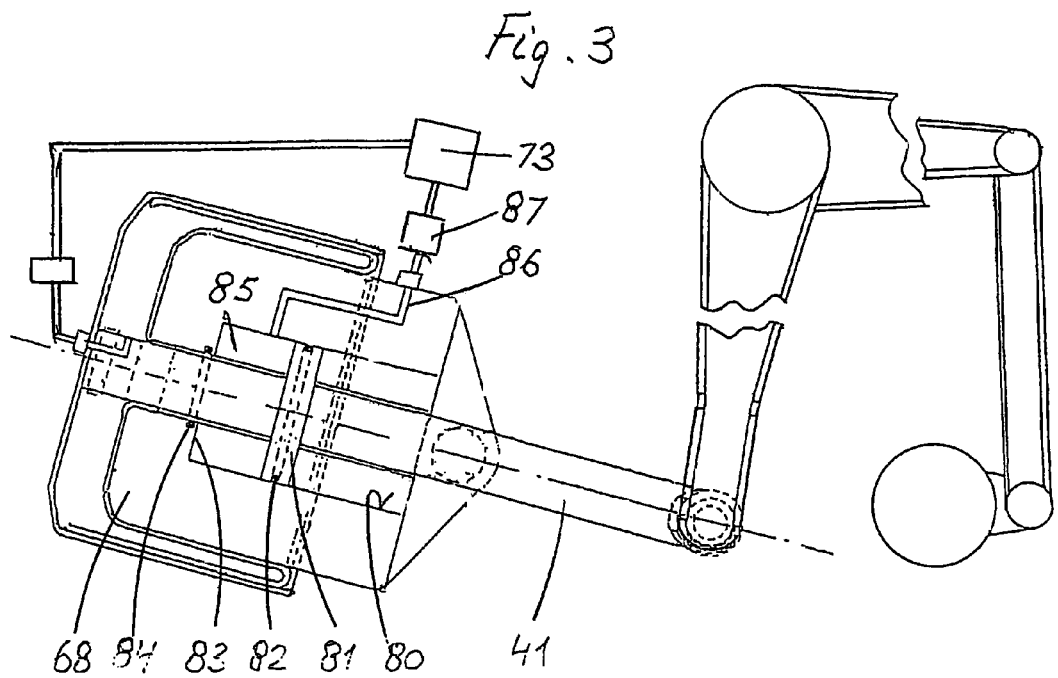
FIG. 3 is a longitudinal section similar to that shown in FIG. 2, but showing a different embodiment of the invention.

As shown in FIGS. 2 and 3, press rod's second end portions 45,46 are fixedly attached to a corresponding outer housing 63 of spring elements 61,62. These housings 63 and have a bottom 65 and a cylindrical sidewall 66 and an opening 67 on the opposite side of bottom 65. The fourth arms 41,42 extend through the corresponding openings 67 and are fixedly attached with the portion of bottom 65 directed in towards the interior of housing 63,64.

A piston-like head 68 is slidably and sealingly arranged in outer housing 63 and is introduced in the housing via opening 67. Head 68 is connected to the chassis via a shaft extension 56 that runs parallel with shaft extension 55. Alternatively, axle extension 56 may have a spherical surface that permits the swinging of head 68 also about an axis that runs perpendicular to the longitudinal axis of the fourth arms 41,42. Within head 68 is provided an axial bore 69, wherethrough run the corresponding, fourth arms 41, 42, such arms being sealingly arranged and displaceable in their lengthwise direction in relation to housing 63 i.e. either slidable or with clearing. A seal can be achieved by the help of a membrane 60 that is attached to both housing 63 and head 68, such that a portion of membrane 60 runs along the inside of housing wall 66 and another portion of the membrane runs along the outside of the outer surface of head 68. Between these two portions, the membrane has a folded portion. Membrane 60 defines a first pressure chamber 70.

This embodiment of the device according to the invention functions as described below.

When the chassis exerts a load on wheel axle housing 3, and for the sake of simplicity is assumed that the chassis does not tilt in relation to the wheel axle housing, then the chassis will as a result be lowered in relation to wheel axle housing 3. Thereby, torsion element 4 will be rotated in relation to the chassis, in that the first arms will be swung in a counterclockwise direction as shown in FIG. 3 because of these arms' connection with wheel axle housing 3 via the second arms 21,22.

Because torsion element 4 is however also connected with the third arms 31,32 and also attempt to rotate these in a counterclockwise direction, then these third arms will attempt to draw the fourth arms 41,42 and the housing 63,64 towards the right as shown in FIG. 3. Because head 68 however is connected with the chassis via axle extension 56, the volume of pressure chamber 70 will be reduced, whereby the pressure of the gas in pressure chamber 70 will be increased and exert a force that attempts to press housings 63 and the arms in the opposite directions. This pressure thereby creates an opposing force that prevents a further lowering of the chassis in relation to the wheel axle housing 3.

The vertical arrangement of the second arms 21,22 and the arrangement of the spring/suspension elements 61,62 that are connected to torsion element 4 via the third and the fourth arms 31,32 and 41,42 respectively, creates a minimally space-demanding, inexpensive and simple spring/suspension of wheel axle housing 3 in the vehicle. The arrangement of the torsion element and the spring/suspension elements on the side of the wheel axle housing that is directed towards the vehicle's midsection, seen from the vehicle's lengthwise direction, allows for a reduction in the length of the vehicle.

In either housing 61,62 or head 68 there can be provided a channel 71 that by way of a valve 72 can be arranged to be connected to a pressurized gas source 73, that in the event of a gas leakage from pressure chamber 70 can be filled with gas. In the alternative, the ground clearance of the vehicle's chassis can be set.

The spring/suspension elements thereby function as a simple pressure fluid actuator.

The device can be used in a simple matter for raising of the wheel axle housing. For this purpose, as shown in FIG. 3, head 68 can for example be provided with an extension of boring 69, wherein this extension is concentric in relation to bore 69 and forms a cylinder 80. The fourth rod 41,42 is hereby provided with a flange that forms a piston 81 that is arranged to sealingly glide in cylinder 80 in that piston 81 is provided with a gasket 82. Cylinder 80 has a bottom 83 and near bottom 83 the head carries a gasket 84 that creates a seal between the fourth rod 41,42 and boring 69 in head 68. The bottom 83, cylinder 80 and piston 81 defines a second pressure gas chamber 85, and there is arranged in head 68 a channel 86 that is designed to connect chamber 85 with pressurized gas source 73 by way of a valve 87. It should be understood that the channel can alternatively be provided in the housing and/or the fourth arm 41.

By the introduction of pressurized gas in the second chamber 85 and the possible release of gas from the first chamber 70, the fourth arms 41,42 can be moved to the right as shown in FIG. 4 and the first, second and third arms as well as the torsion element can be swung counterclockwise and the wheel axle housing thereby raised in relation to the chassis until the wheels touch the ground, in that the chassis will then be supported by the remaining wheel axles.

It can thus be seen that the invention provides a very compact, inexpensive and simple multifunction device for supporting a wheel axle housing in a vehicle.

The invention claimed is:

1. A device for connecting a wheel axle housing with a chassis of a vehicle, comprising:
    a stabilizer having a single rod shaped torsion element, the torsion element having a longitudinal axis and being arranged to rotate about the longitudinal axis;
    two first arms running in a crosswise direction in relation to the torsion element having first end portions that are rigidly and directly attached to corresponding end portions of the single rod shaped torsion element;
    two second arms having first end portions and second end portions, the first end portions of the second arms being articulatedly attached to second end portions of the first arms whereby the first and second arms extend at an angle in relation to the longitudinal axis of torsion element and whereby the second end portions of the second arms are connected to the wheel axle housing and extend essentially vertically up from the wheel axle housing; and
    at least two spring-suspension elements with a first member that is operatively connected with the wheel axle housing, and a second member that is connected to the chassis, whereby members are arranged for reciprocal resilient movement and to transfer a portion of the weight of the chassis to the wheel axle housing;
    wherein the spring-suspension elements have corresponding third arms having first end portions that are rigidly and directly attached to the corresponding end portions of the single rod shaped torsion element, and second end portions that are connected with the first member; and
    wherein the single rod shaped torsion element can be caused to rotate about the torsion element longitudinal axis by a force exerted by the two first arms or by a force exerted by the two third arms of the spring-suspension elements.

2. The device according to claim 1 wherein the wheel axle housing is arranged to be raised such that a corresponding wheel does not touch the ground, whereby the first and second members of the spring-suspension elements are displaceable in a lengthwise direction in relation to each other and whereby the spring-suspension elements comprise force exerting means that are arranged to move the first and second members reciprocally in the lengthwise direction.

3. The device according to claim 2 wherein the first and second members of the spring-suspension elements define a pressure chamber containing a gas and the force exerting means comprise a channel that is arranged in one of the members, and that is arranged to connect pressure chamber with a pressurized gas source, whereby an increase of the gas pressure in the pressure chamber causes a reciprocal movement of the first and second members of the spring-suspension elements in the lengthwise direction.

4. The device according to claim 1, wherein the torsion element is arranged on a side of the wheel axle housing that is directed towards the vehicle's midsection, seen in the vehicle's lengthwise direction.

5. The device according to claim 1, wherein the second member is articulatedly connected with the chassis.

6. The device according to claim 1, wherein the spring-suspension elements define a pressure chamber containing a gas, whereby an increase in the weight of the chassis results in a reduction of the volume of pressure chamber and an increase in the pressure of the gas.

7. The device according to claim 6 wherein a membrane further defines the pressure chamber and is arranged between the first and second members of each spring-suspension element.

* * * * *